Nov. 26, 1946.  E. H. LEHMAN ET AL  2,411,630
SHOCK ABSORBER
Filed Dec. 26, 1944
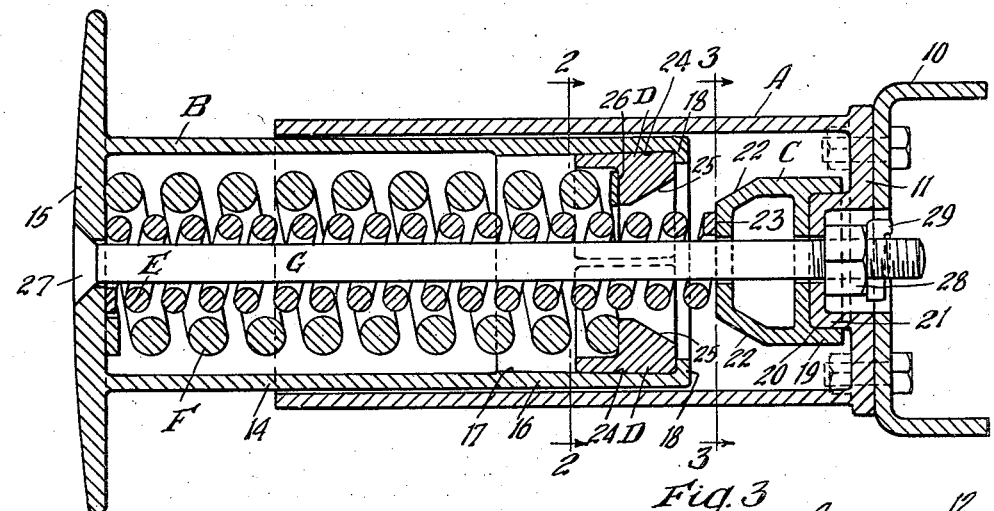
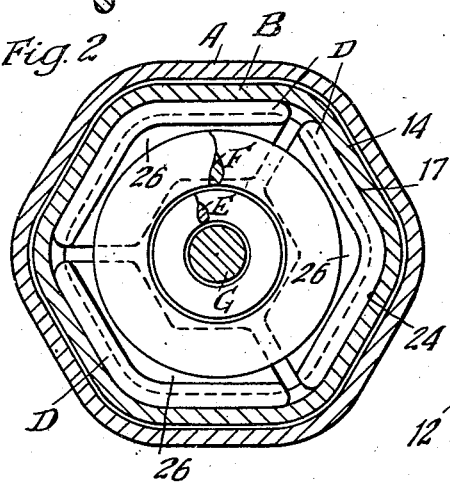
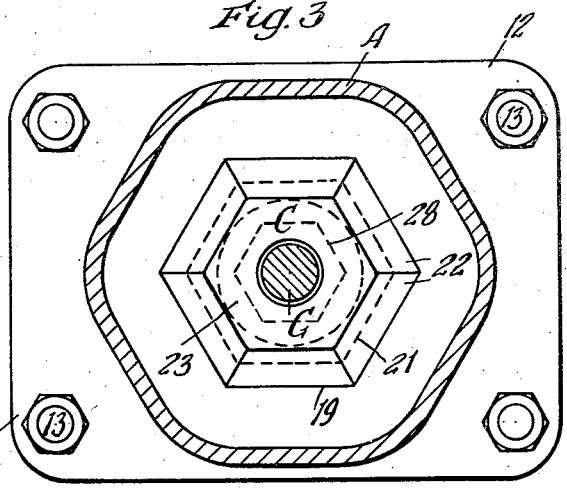
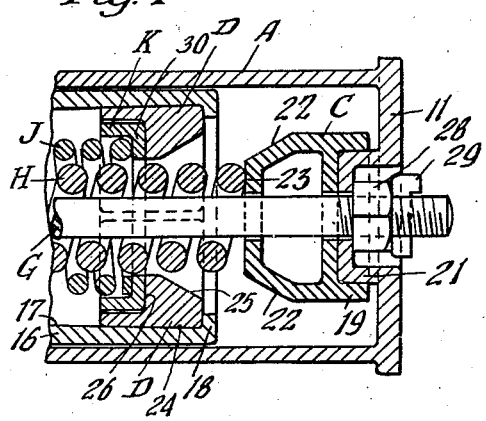
Inventors
Edward H. Lehman
George E. Dath
By Henry Fuchs
Atty.

Patented Nov. 26, 1946

2,411,630

UNITED STATES PATENT OFFICE 2,411,630

SHOCK ABSORBER

Edward H. Lehman, Chicago, and George E. Dath, Mokena, Ill., assignors to W. H. Miner, Inc., Chicago, Ill., a corporation of Delaware Application December 26, 1944, Serial No. 569,817

5 Claims. (Cl. 213—221)

This invention relates to improvements in shock absorbers, and more particularly to shock absorbers employed as buffers for railway cars.

One object of the invention is to provide a simple and efficient shock absorber employed as a buffer for railway cars having preliminary spring action to absorb the lighter shocks to which the mechanism is subjected, and relatively high frictional resistance to absorb the heavier shocks, wherein the frictional resistance is produced by relatively movable friction elements which become operative after a predetermined compression of the mechanism.

A more specific object of the invention is to provide a mechanism as set forth in the preceding paragraph, wherein the relatively movable friction elements include a friction casing and a spring resisted friction clutch slidable within the casing, the clutch including friction shoes and a wedge block adapted to have wedging engagement with the shoes after a predetermined amount of compression of the mechanism, the wedge block being held spaced from the shoes in the normal full release position of the mechanism by spring means which provides the preliminary spring action by compression thereof while the wedge block is being moved toward the shoes.

Other objects of the invention will more clearly appear from the description and claims hereinafter following.

In the drawing forming a part of this specification, Figure 1 is a longitudinal, vertical sectional view of our improved buffer mechanism in position on the end of a car. Figures 2 and 3 are transverse, vertical sectional views, on an enlarged scale, corresponding substantially to the lines 2—2 and 3—3 of Figure 1. Figure 4 is a view, similar to Figure 1, of the rear end portion of the shock absorber, illustrating another embodiment of the invention.

In said drawing, 10 indicates a portion of the end wall of a railway car, the portion illustrated being to one side of the longitudinal center line of the car and having our improved buffer mechanism mounted thereon. As will be understood, the buffer mechanism is duplicated on the other side of the end of the car and the two mechanisms cooperate in a well-known manner with a pair of similar buffer mechanisms on the end of an adjacent car.

Referring first to the embodiment of the invention illustrated in Figures 1, 2, and 3, our improved buffer mechanism comprises broadly a housing A; a combined buffer head and friction casing B; a wedge member C; three friction shoes D—D—D; a preliminary spring resistance E; a main spring resistance F; and a retainer bolt G.

The housing A is in the form of a tubular casing of hexagonal, transverse cross section, closed at its rear end by a transverse, vertical wall 11, which is extended laterally outwardly at opposite sides of the housing, providing flanges 12—12. The housing A is secured to the end of the car by bolts 13—13 and 13—13 extending through the flanges 12—12 of the housing A and the end wall 10 of the car.

The combined buffer head and friction casing B comprises the casing 14 and the buffer head proper 15. The casing 14 is in the form of a tubular shell of hexagonal, transverse cross section, and is closed at its front end by the buffer head proper 15, which forms a transverse wall of said casing and extends laterally outwardly beyond the same. The casing 14 is slidingly telescoped within the hexagonal housing A and snugly fits the same so that the buffer head is held against rotation with respect to the housing. The rear end of the casing 14 is open and said open end has the side walls thereof laterally inwardly thickened, as indicated at 16, said thickened portion of the casing forming the friction shell proper of the same. The wall portions 16 of the casing present three inwardly or forwardly converging friction surfaces 17—17—17 of V-shaped transverse cross section. At the rear end of the casing 14, the same is provided with an inturned, annular stop flange 18 which overhangs the ends of the shoes D—D—D and restricts outward movement of the latter.

The wedge C is in the form of a hollow block of hexagonal, transverse cross section having a rearwardly projecting, peripheral flange 19 of hexagonal outline, thereby providing a rearwardly facing seat 20. The seat 20 is adapted to receive an inwardly projecting, hollow boss 21 on the end wall 11 of the housing A. As will be evident, the wedge block is thus seated on the hollow boss 21 and held against rotation by interlocking engagement with said boss, which is also of hexagonal, transverse cross section. At the forward or inner end thereof, the wedge block C has three wedge faces 22—22—22 of V-shaped, transverse cross section. The wedge faces 22—22—22 are arranged symmetrically about the longitudinal, central axis of the mechanism and converge forwardly of the same. The forward end of the wedge block C is flat and presents a transverse abutment face 23 for the front end of the preliminary spring resistance E.

The friction shoes D—D—D are arranged interiorly of the casing 14 of the combined buffer head and friction casing B. Each shoe D has a longitudinally extending friction surface 24 on the outer side thereof of V-shaped, transverse cross section. The friction surfaces 24—24—24 of the three friction shoes D—D—D cooperate respectively with the three friction surfaces 17—17—17 of the casing 14. On the inner side, each shoe D is laterally enlarged, and the enlargement thereof has a V-shaped wedge face 25 thereon adapted to be engaged by the corresponding V-shaped wedge face 22 of the wedge block C. The enlargement of the shoe also presents a transverse abutment face 26 at its inner end which serves as a seat for the front end of the spring resistance F.

The preliminary spring E is in the form of a relatively long, light, helical coil, bearing at its front end on the front wall 15 of the casing 14 and at its rear end on the end face 23 of the wedge block C. As shown most clearly in Figure 1, the spring E extends between the shoes D—D—D and normally holds the wedge block C spaced rearwardly from the shoes.

The main spring resistance F is in the form of a relatively heavy coil which surrounds the preliminary spring E and has its front and rear ends bearing respectively on the end wall 15 of the casing 14 and the abutment faces 26—26—26 of the three friction shoes D—D—D. The spring F is under predetermined initial compression and holds the friction shoes D—D—D seated against the retaining flange 18 of the casing 14.

The retainer bolt G, which holds the mechanism assembled and of uniform overall length, has a head 27 at its front end seated in a suitable pocket in the buffer head proper 15 of the combined buffer head and friction casing. The shank of the bolt G extends through the preliminary spring E and aligned openings in the wedge block C and the boss 21 of the housing A. At the rear end, the bolt G is provided with a retaining nut 28, which is disposed within the hollow boss and seated against the transverse front wall of the same. The nut is secured against removal by a locking key 29 extending through the shank of the bolt. As will be seen upon reference to Figure 1, the end wall 10 of the car is suitably recessed to accommodate the nut 28 of the bolt G. When the mechanism is completely assembled, the bolt G is so adjusted that the wedge block C is spaced an appreciable distance rearwardly from the open rear end of the friction casing 14 of the combined buffer head and friction casing B, thereby providing for preliminary compression of the spring resistance E before the wedge faces of the wedge block engage the wedge faces of the friction shoes D—D—D to wedge the latter apart and move the same inwardly with respect to the friction casing 14.

The operation of our improved buffer mechanism is as follows: Upon inward movement of the combined buffer head and friction casing B through pressure exerted thereon by any object, such as the buffer head of an adjacent car, the preliminary spring resistance E is compressed between the buffer head and the wedge block C, the latter being held against rearward movement by abutting the projecting boss on the rear wall of the housing A. The lighter shocks are thus absorbed by the spring E. As the buffer head is moved inwardly of the housing A, when heavier shocks are encountered, the friction shoes D—D—D are moved into engagement with the wedge C and wedged apart by the cooperating wedge faces of the wedge and shoes, and forced to slide with respect to the friction casing 14. During this action, the spring F, which resists movement of the shoes, is compressed and high frictional resistance is provided between the shoes and the friction casing 14 to absorb the heavy shocks encountered in service. Inward movement of the combined buffer head and friction casing B is limited by engagement of the buffer head proper 15 with the front end of the housing A. When the actuating force is removed, the expansive action of the springs E and F restores all of the parts to the normal full release position shown in Figure 1, rearward movement of the shoes D—D—D with respect to the friction casing 14 being limited by the flange 18 of the latter, and outward movement of the combined buffer head and friction casing B being limited by the retainer bolt G.

Referring next to the embodiment of the invention illustrated in Figure 4, the construction is the same as that of the mechanism described in connection with Figures 1, 2, and 3, with the exception that a spring follower ring is interposed between the outer coil spring and the shoes, and that the outer coil spring is lighter than the inner coil or preliminary spring. In Figure 4, the parts which are identical with those shown in Figures 1, 2, and 3, are indicated by the same reference characters as used in Figures 1, 2, and 3. In Figure 4, the preliminary spring, which is indicated by H, is heavier than the outer or main spring resistance, which is indicated by J.

The spring follower ring, which is interposed between the friction shoes and the rear end of the spring J, is indicated by K. This spring follower ring is in the form of a tubular collar having an inturned flange 30 at its rear end. The flange 30 seats on the transverse abutment faces 26—26—26 of the shoes D—D—D and the tubular collarlike portion of the ring bears on the inner sides of the portions of the shoes which project forwardly of the laterally enlarged sections thereof. The spring resistance J is under predetermined initial compression and holds the shoes seated against the stop flange 18 of the casing 14. As will be evident, the spring follower ring K maintains the front or inner ends of the shoes spread apart at all times during the operation of the mechanism. The operation of the embodiment of the invention illustrated in Figure 4 is substantially the same as that described in connection with the disclosure of the invention shown in Figures 1, 2, and 3.

We claim:

1. In a shock absorber, the combination with a friction casing; of friction shoes slidingly telescoped within the casing; spring means within the casing yieldingly opposing movement of the shoes inwardly of the casing; means on said casing engageable by said shoes for restricting outward movement of the shoes; a wedge block normally spaced from said shoes to provide lost motion between the shoes and wedge block, said block and shoes having cooperating wedge faces; and spring means yieldingly opposing movement of said casing and wedge toward each other, said spring means in expanded condition holding the wedge block in said normally spaced relation with respect to the shoes with the wedge faces of said wedge and shoes separated.

2. In a shock absorber, the combination with a friction casing having a friction shell section at one end; of a plurality of friction shoes having sliding frictional engagement with the interior walls of the shell, said shoes having wedge faces on their inner sides; spring means reacting between the casing and shoes, yieldingly opposing movement of the shoes inwardly of the casing; a central wedge block normally spaced from the casing and having wedge faces engageable with the wedge faces of the shoes; and a preliminary spring reacting between the wedge and casing and yieldingly holding said wedge projected outwardly from the casing in spaced relation to the latter.

3. In a shock absorber, the combination with a friction casing having a friction shell section at one end; of a wedge, said casing and wedge being movable with respect to each other lengthwise of the mechanism; friction shoes having sliding frictional engagement with the interior walls of the shell, said wedge and shoes having wedge faces engageable with each other after a predetermined compression of the mechanism, said wedge and shoes having lost motion therebetween during the extent of said predetermined compression of the mechanism and being engageable with each other after said predetermined compression has been taken up; a main spring resistance yieldingly opposing relative lengthwise movement of the casing and shoes toward each other; and a preliminary spring yieldingly opposing relative lengthwise movement of the casing and wedge.

4. In a shock absorber, the combination with a housing fixed to the end of a car; of a combined buffer head and friction casing movable toward and away from the housing lengthwise of the mechanism; a wedge buttressed against said housing and held against movement inwardly thereof; friction shoes slidable within the casing, said shoes and wedge having wedge faces engageable with each other after a predetermined compression of the mechanism; a preliminary spring resistance reacting between the casing and wedge and yieldingly spacing the wedge from the shoes in a direction lengthwise of the mechanism; and a main spring resistance yieldingly opposing relative movement of the shoes and casing lengthwise of the mechanism.

5. In a shock absorber, the combination with a friction casing having a friction shell section at one end; of a plurality of friction shoes having sliding frictional engagement with the interior walls of the shell, said shoes having wedge faces on their inner sides; spring means reacting between the casing and shoes, yieldingly opposing movement of the shoes inwardly of the casing; a spring follower ring interposed between the preliminary spring and shoes and bearing at the front and rear sides on said shoes and preliminary spring, respectively, said spring follower ring engaging the inner sides of said shoes to hold the latter spread apart; a central wedge block normally spaced from the casing and having wedge faces engageable with the wedge faces of the shoes; and a preliminary spring reacting between the wedge and casing and yieldingly holding said wedge projected outwardly from the casing in spaced relation to the latter.

EDWARD H. LEHMAN.
GEORGE E. DATH.